United States Patent [19]

Delano

[11] Patent Number: 4,739,859
[45] Date of Patent: Apr. 26, 1988

[54] METHOD AND APPARATUS FOR REDUCING THE STRETCH OF AN ELASTOMERIC DIAPHRAGM OF A LAND SEISMIC SOURCE

[75] Inventor: Anthony J. Delano, Easton, Conn.

[73] Assignee: Bolt Technology Corporation, Norwalk, Conn.

[21] Appl. No.: 850,236

[22] Filed: Apr. 10, 1986

[51] Int. Cl.⁴ .............................................. G01V 1/00
[52] U.S. Cl. ..................... 181/119; 181/120; 181/401; 367/144
[58] Field of Search ................................. 73/663, 666; 116/142 FP; 181/110, 113, 114, 115, 116, 117, 118, 119, 120, 400, 401, 402; 367/140, 141, 143, 144, 145, 146, 148

[56] References Cited

U.S. PATENT DOCUMENTS

| | | | |
|---|---|---|---|
| 3,310,128 | 3/1967 | Chelminski | 181/401 X |
| 3,670,839 | 6/1972 | Savit | 181/120 |
| 3,718,206 | 2/1973 | Babb et al. | 181/119 X |
| 3,800,907 | 4/1974 | Chelminski | 181/119 |
| 4,108,271 | 8/1978 | Chelminski | 181/119 |
| 4,334,591 | 6/1982 | Martin | 181/401 X |

Primary Examiner—Deborah L. Kyle
Assistant Examiner—Brian S. Steinberger
Attorney, Agent, or Firm—Parmelee, Bollinger & Bramblett

[57] ABSTRACT

A land seismic energy source is provided having a rigid dome-shaped bell containing a substantially imcompressible liquid and an airgun for abruptly releasing pressurized gas into the liquid for generating powerful seismic impulses. The bell has a lower rim with a metal pan positioned below the rim for engaging the surface of the earth below the bell, and it is mounted for upward and downward movement relative to the bell. A resilient, flexible elastomeric diaphragm is mounted on the rim of the bell and extends across the bottom of the bell for retaining the liquid in the bell. The pan is provided with a rising, generally convex, upwardly extending surface on the bottom of the pan with the diaphragm initially resting on the upwardly extending surface on the bottom of the pan thereby assuming a generally concave configuration across the bottom of the bell, which results when the airgun is fired in reducing the amount of downward deflection of the diaphragm thereby reducing the amount of stretching of the diaphragm and increasing the life of the diaphragm. The rising, upwardly extending surface may be integrally formed on the pan or may comprise a steel hump which is welded to the pan using peripheral as well as plugged welds. The top surface of the hump is smooth all of the way to the bottom of the pan.

5 Claims, 3 Drawing Sheets

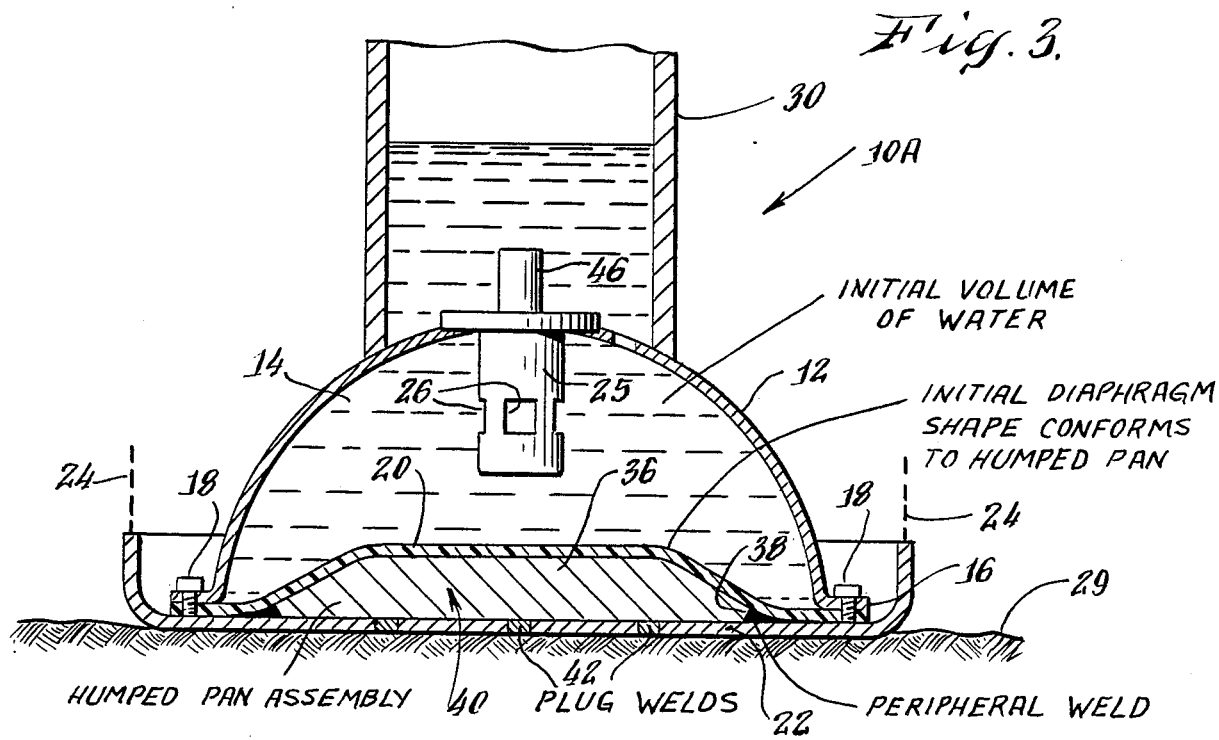
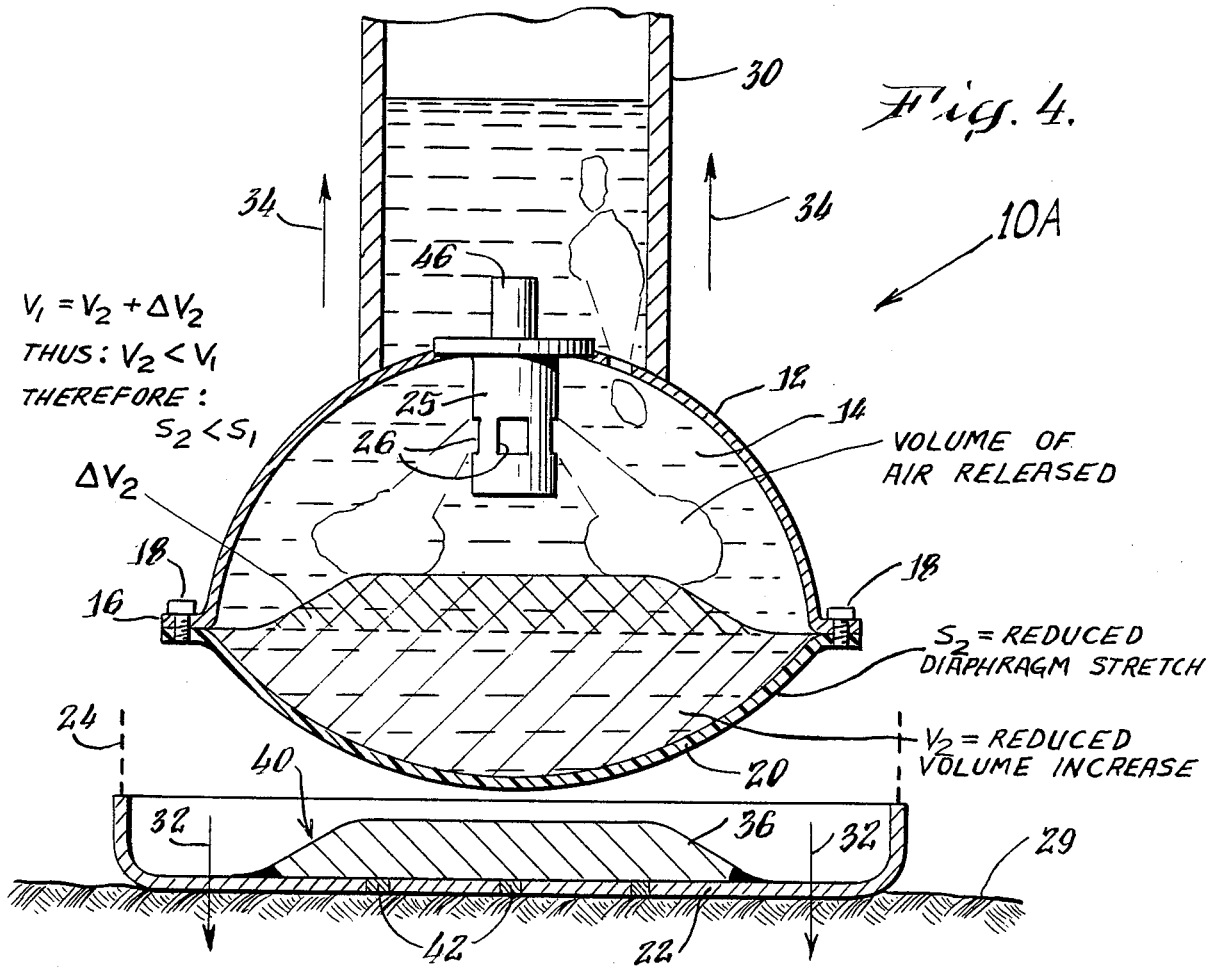

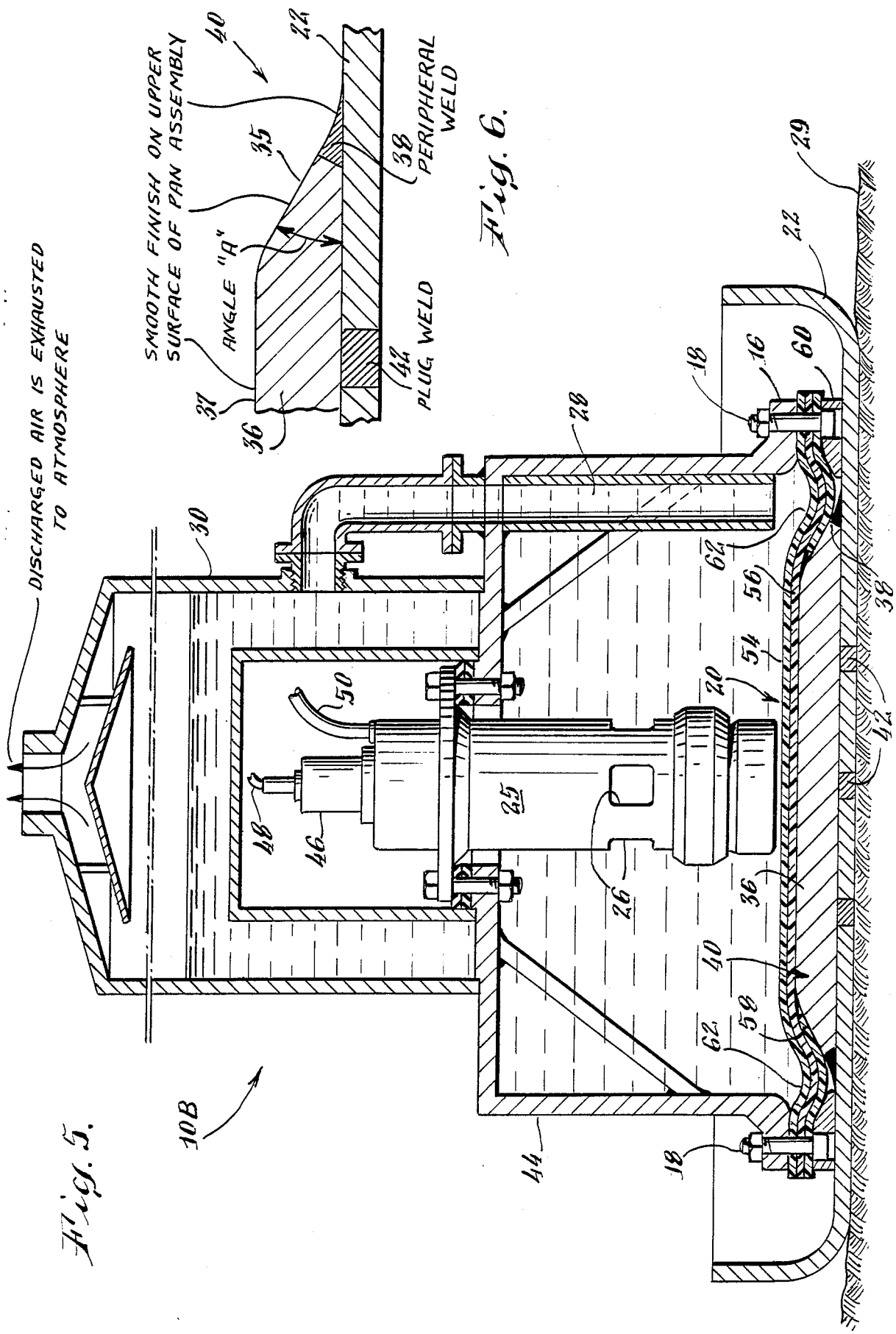

METHOD AND APPARATUS FOR REDUCING THE STRETCH OF AN ELASTOMERIC DIAPHRAGM OF A LAND SEISMIC SOURCE

BACKGROUND OF THE INVENTION

This invention relates to a seismic energy land source for seismic surveying of the earth, and more particularly, to an improved method and apparatus for reducing the stretch of the elastomeric diaphragm of seismic land sources.

Mobile seismic land sources have been constructed in a compact form having the tank in the form of an inverted dome with a displaceable diaphragm covering the bottom of the dome thereby enclosing an incompressible liquid such as water therein. The tank includes an airgun for abruptly releasing pressurized gas into the liquid for generating seismic impulses which are transmitted by a metal plate which is positioned between the diaphragm and the earth so that upon the firing of the airgun and the abrupt release of high pressure gas into the liquid, the flexible diaphragm will suddenly thrust down on the metal plate or pan to displace a portion of the earth beneath the pan thereby transmitting seismic impulses into the earth. One such seismic land source of this type is shown and described in U.S. Pat. No. 4,108,271 which may be referred to for further information with respect to this type of land source.

Although such land sources have proven extremely valuable and are rugged and mobile, the diaphragms of such sources are subject to considerable wear and tear as they are repeatedly subjected to considerable amounts of stretch from the volume of compressed air which is released into the bell or tank each time an airgun is fired thereby bulging or stretching the diaphragm on each such firing. This repetitive and continual bulging and stretching of the diaphragm eventually causes the diaphragm to rupture thereby producing considerable downtime while the diaphragm is replaced and the tank refilled with liquid.

SUMMARY OF THE INVENTION

Accordingly, it is an object of this invention to provide a new and improved method and apparatus for lengthening the life of an elastomeric diaphragm of a seismic land source.

Another object of this invention is to provide a new and improved method and apparatus for reducing the stretch and thereby lengthening the life of a diaphragm of a land source which is easy to implement, relatively inexpensive and which may be applied as a modification to land sources already in the field.

In carrying out this invention in one illustrative embodiment thereof, a method and apparatus are provided in a seismic energy land source for transmitting powerful seismic energy impulses into the earth of a type having a rigid, dome-shaped bell containing a substantially incompressible liquid and an airgun for abruptly releasing pressurized gas into the liquid for generating seismic impulses, said bell having a lower rim with a metal pan positioned below that lower rim for engaging the surface of the earth below the bell and mounted for upward and downward movement relative to the bell. A resilient, flexible elastomeric diaphragm is mounted on the rim and extends across the bottom of the bell initially resting down on said pan for retaining the liquid in the belt in which the improved method comprises providing an upper surface on the pan which humps upwardly and allowing the elastomeric diaphragm initially to be deflected inwardly toward the interior of the bell as the diaphragm is initially resting down upon the upwardly humped surface of the pan thereby reducing the amount of downward bulging of the diaphragm as a result of the sudden release of pressurized gas into the volume of liquid for consequently reducing the amount of stretching of the diaphragm for increasing the life of the stretchable, elastomeric diaphragm. The pan is provided with an integral or welded rising generally convex, upwardly extending surface on the bottom of the pan which surface is smooth so as not to put unnecessary stress on the bottom of the diaphragm.

BRIEF DESCRIPTION OF THE DRAWINGS

The invention, together with further aspects, objects, features and advantages thereof will become more fully understood from the following description considered in connection with the accompanying drawings in which like elements are designated with the same numerals throughout the various views.

FIG. 3, is a cross-sectional view of a new and improved seismic land source in accordance with the present invention illustrating the land source in its rest position with the diaphragm in contact with the bottom of a humped pan in accordance with the present invention.

FIG. 4, illustrates the firing of the airgun of the land source of FIG. 3 illustrating the reduced stretch of the diaphragm caused by the humped pan in accordance with the present invention.

FIG. 5, is a cross-sectional view of another embodiment of the new and improved seismic land source in accordance with the present invention.

FIG. 6, is an enlarged cross-sectional view of the pan assembly illustrating the manner in which the humped smooth upper surface of the pan assembly is welded to the pan.

DESCRIPTION OF THE PREFERRED EMBODIMENTS

Figure 1:
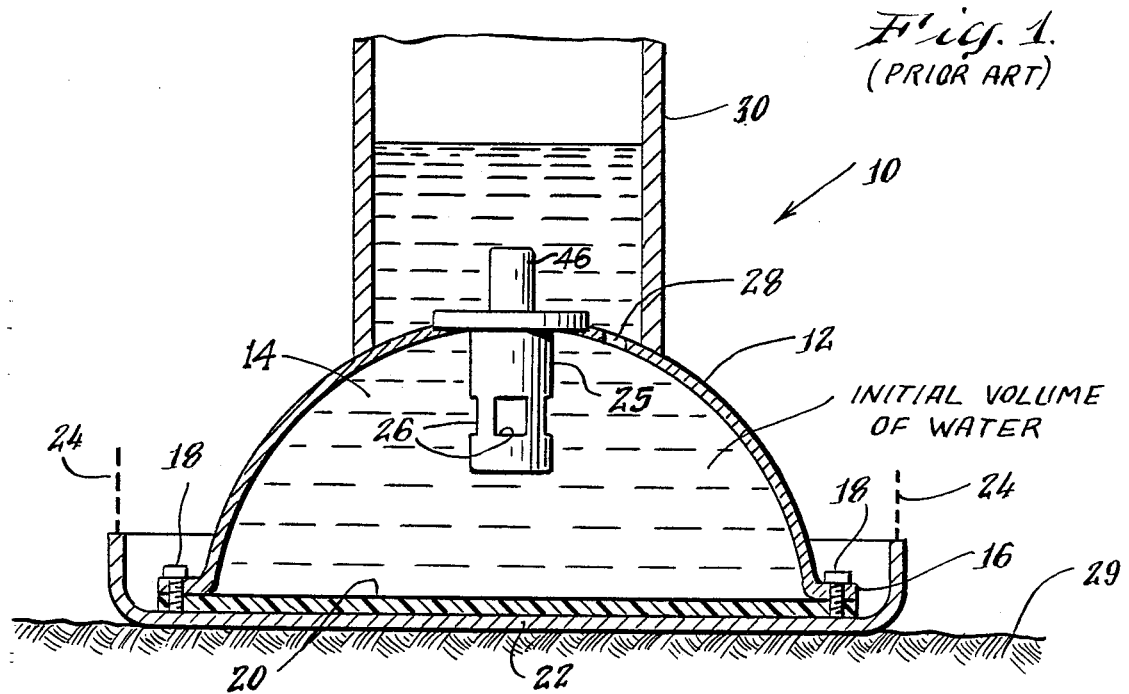
FIG. 1, is a cross-sectional view of a prior art seismic land source in its initial unfired state, with the diaphragm of the land source in contact with the pan of the source which rests on the surface of the earth.
Figure 2:
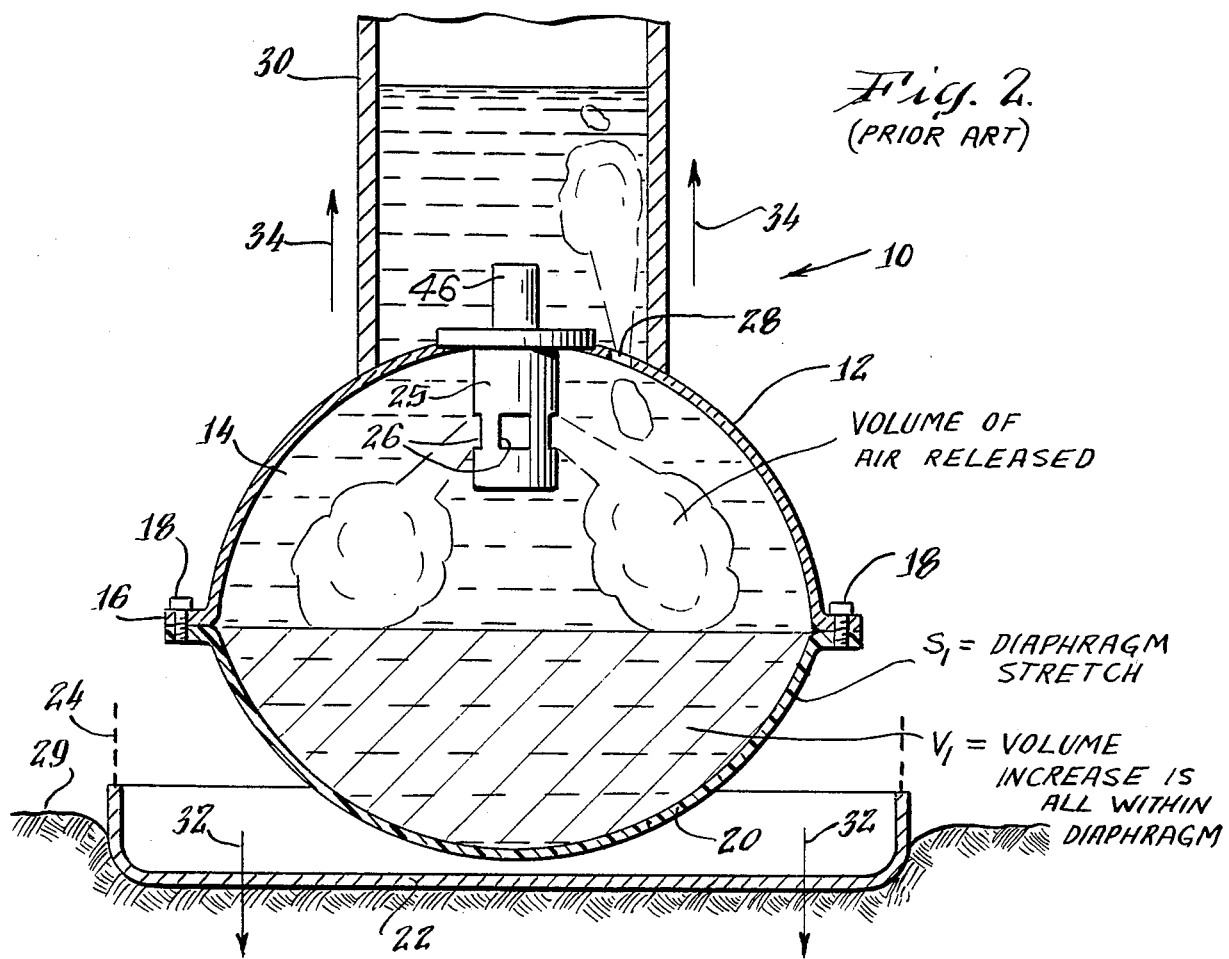
FIG. 2, is a cross-sectional view of the prior art seismic land source illustrated in FIG. 1, in which the airgun of the source has been fired thereby releasing high pressure air into the tank of the land source stretching the diaphragm and sending seismic impulses into the earth.

Referring now to FIGS. 1 and 2, a prior art seismic land source, referred to generally with the reference numeral 10, comprises a dome-shaped rigid container, chamber or bell 12 which is filled with a substantially incompressable liquid 14, such as water. The container or bell 12 has a rim 16 to which a flexible, elastomeric diaphragm 20, which extends across the bottom of the bell, is attached by any suitable means, such as bolts 18 and a clamp ring (not shown) and thereby encloses the bell 12. A metal pan 22 having a retaining means 24 attached thereto for holding the pan on the land source 10 positions the metal pan 22 below the rim 16 of the bell 12 for engaging the surface of the earth 29. The elastomeric diaphragm 20 as shown in FIG. 1, is in contact with the bottom of the pan 22, and the pan is mounted by its retaining means 24 in the land source 10 for downward movement with respect to the bell 12.

An airgun 25 having a plurality of ports 26 is mounted on the top of the bell or container 12. The airgun 25 is adapted to be charged with high pressure gas which can be fired and released through the ports 26 of the airgun 25 thereby abruptly releasing pressurized gas into the liquid 14 in the bell 12 as is illustrated in FIG. 2. A gas-liquid separator 30 which is in communication with the chamber or bell 12 through an opening 28 permits a volume of the released air to eventually pass through the separator 30 into the atmosphere.

In operation of the prior art land source of FIGS. 1 and 2, it will be seen in FIG. 1 that prior to the firing of the airgun 25, the elastomeric diaphragm 20 is in contact with the bottom of the pan 22 in its initial quiescent state. When the airgun is fired as illustrated in FIG. 2, a volume of air is released from the ports 26 of the airgun 25 substantially increasing the volume in the bell which is the combined initial volume of water in the bell along with the volume of the air released, thereby stretching the diaphragm to S1 with the volume increase all being in the diaphragm and referred to as $V_1$. The firing of the airgun 25 abruptly releasing the pressurized gas in the liquid which increases the volume in the bell 12 causing the expansion or stretching of the diaphragm produces a downward force on the pan as illustrated by the arrows 32 in FIG. 2 as well as a reaction or upward force on the land source 10 as illustrated by the arrows 34. Thus, the land source will thrust the pan 24 downward against the earth transmitting seismic powerful impulses into the earth each time the airgun is fired. As has been pointed out, the increased volume of the pressurized air all occurs within the diaphragm 20 and stretches the diaphragm such that continual repetition puts such strain on the diaphragm 20 that it will ultimately fracture.

This problem is treated by modifying the land source 10A in the manner shown in FIGS. 3 and 4. The pan 22 is provided with a hump 36 to form a humped pan assembly 40. The humped pan assembly 40, a portion of which is shown in enlarged cross-sectional view in FIG. 6 is formed by a steel hump 36 which is secured to the pan 22 by a peripheral weld 38 and a plurality of plugged welds 42. For example, the plugged welds may be 9 in number with one in the center surrounded by 8 holes spaced on 12" centers. The hump 36 has a smooth upper surface 37 which is a rising, generally convex upwardly extending surface having sloping sides 35 which form an angle A of approximately 30° with the bottom of the pan. The hump with its sloping sides with a plateau type top is securely welded to the bottom of the pan in order to withstand the enormous forces which are applied thereto when the airgun 25 is fired. At the same time, the smooth upper surface accommodates intimate contact with the diaphragm and must be smooth in order not to dammage the diaphragm on the firing of the airgun.

As will be seen in FIG. 3, the initial shape of the diaphragm 20 conforms to the shape of the humped pan. On the firing of the airgun 25 as seen in FIG. 4, the volume of the chamber or bell 12 is increased by the air released from the airgun and the stretching of the diaphragm 20 to accommodate a portion of that released air. Referring again to the prior art of FIGS. 1 and 2, it will be observed that on the firing of the airgun 25, $V_1$ equals the volume increase which is all within the diaphragm thereby providing a diaphragm stretch of $S_1$. In FIG. 4 on the firing of the airgun, $V_1$ equals the $V_2$ plus $\Delta V_2$ which is the volume of the steel hump. Thus $V_2$ is the reduced volume increase within the diaphragm 20 in which the volume of the hump reduces the diaphragm stretch which is equal to $S_2$. Accordingly, $V_2$ is less than $V_1$, and therefore $S_2$ is less than $S_1$ thereby reducing the stretch of the diaphragm which is accomplished solely by the use of the humped pan. On repeated firing the reduced stretch $S_2$ of the diaphragm provides less stress thereon and accordingly, produces longer life for the diaphragm. The greater life for the diaphragm produces less downtime for the seismic land source 10A as well as savings in the cost of the diaphragm and its installation.

FIG. 5 illustrates another embodiment in which the seismic source 10B is provided with a cylindrical chamber or tank 44 housing the airgun 25 more fully showing the firing solenoid valve 46 with a firing cable 48 extending therefrom. A high pressure hose line 50 is also illustrated which supplies and charges the airgun 25 with high pressure air. More detail is also illustrated for the gas liquid separator 30 which forms no part of the present invention. Any suitable gas-liquid separator can be used, and a gas-liquid separator is described in detail in U.S. Pat. No. 3,779,335.

In the embodiment illustrated in FIG. 5, a humped pan assembly 40 of the type illustrated in FIGS. 3 and 4 is provided with the difference in this embodiment residing primarily in the diaphragm 20, having an upper layer 54, a lower layer 56 which extend and cover the bottom of the cylindrical tank 44 and another skirt layer 58 in which the layers 54, 56 and 58 form a three layered unit which keeps the diaphragm 20 from bulging out laterally when the airgun 25 is fired and forces the diaphragm to bulge down. The purpose of the skirt 58 is to reinforce the diaphragm on firings at its most vulnerable region which is close to the margin where it is attached to the rim of the tank 44. As will be seen in FIG. 5, a tapered clamp ring 60 thinned toward the peripheral weld around the hump 36 reduces the stress even more. The inward taper of this clamp ring 60 provides a transition for the multi-layer diaphragm 20 to curve smoothly downwardly at 62 in the margin region near the peripheral weld 38.

It is to be understood that in FIGS. 3 and 4 a tapered clamp ring (not shown) can be used to advantage.

The plateau top area of the hump preferably has a diameter at least 30% of the diameter of the diaphragm as defined by the ring of bolts 18. The diameter of the hump as measured at the mean diameter of the peripheral weld 38 is at least 60% of the diameter of the diaphragm as defined by the ring of bolts 18.

Accordingly, by reducing the amount of stretch on the diaphragm, the life of the diaphragm is extended reducing the downtime of the seismic source.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. In a seismic energy land source for transmitting powerful seismic energy impulses into the earth of the type having a rigid domeshaped bell containing a substantailly incompressible liquid and an airgun for abruptly releasing pressurized gas into the liquid for generating the seismic impulses, said bell having a lower rim with a metal pan positioned below said lower rim for engaging the surface of the earth below said bell and mounted for upward and downward movement relative to said bell, a resilient, flexible elastomeric diaphragm is mounted on said rim and extending across the bottom of said bell initially resting down on said pan for retaining the liquid in said bell, an improved apparatus for transmitting powerful seismic impulses into the earth while reducing the amount of stretching of the diaphragm comprising:

a rising, generally convex upwardly extending surface on the central region of said earth contact pan, having a centrally located rounded hump on said earth contact pan for providing said rising generally convex upwardly extending surface, said diaphragm initially resting on said upwardly extending surface on said pan thereby assuming a generally concave configuration across the bottom of said bell, said hump having a peripheral weld and a plurality of spaced plug welds for mounting said hump on said earth contact pan, whereby on the firing of said airgun and the sudden release of pressurized air in the liquid as a result thereof, said convex surface on said pan reduces the amount of downward deflection of the diaphragm thereby reducing the amount of stretching of the diaphragm and increasing the life of said diaphragm.

2. The improved land source apparatus for transmitting powerful seismic energy impulses as claimed in claim 1 said hump having a smooth upper surface with upwardly sloping sides which form an angle of about 30° with the bottom of said earth contact pan.

3. In a seismic energy land source for transmitting powerful seismic energy impulses into the earth of the type having a rigid dome-shaped bell containing a substantially incompressible liquid and an airgun for abruptly releasing pressurized gas into the liquid for generating the seismic impulses, said bell having a lower rim with a metal pan positioned below said lower rim for engaging the surface of the earth below said bell and mounted for upward and downward movement relative to said bell, a resilient, flexible elastomeric diaphragm is mounted on said rim and extending across the bottom of said bell initially resting down on said pan for retaining the liquid in said bell, an improved apparatus for transmitting powerful seismic impulses into the earth while reducing the amount of stretching of the diaphragm comprising:

a rising, generally convex, upwardly extending surface on the center region of said earth contact pan, having a centrally located rounded hump on said earth contact pan for providing said rising generally convex upwardly extending surface, said diaphragm initially resting on said rounded hump on said pan thereby assuming a generally concave configuration across the bottom of said bell, said diaphragm being clamped to said lower rim of the bell by a tapered clamp ring tapering downwardly and radially inwardly, and a diaphragm skirt of elastomeric material secured by said clamp ring beneath a margin region of said diaphragm, said diaphragm skirt initially resting upon said tapered clamp ring and upon a peripheral portion of said hump, whereby on the firing of said airgun and the sudden release of pressurized air in the liquid as a result thereof, said initial concave configuration of said diaphragm reduces the amount of downward deflection of the diaphragm thereby reducing the amount of stretching of the diaphragm and increasing the life of said diaphragm.

4. The improved land source apparatus for transmitting powerful seismic energy impulses as claimed in claim 3, in which:

said hump has a plateau top which has a diameter at least 30% of the diameter of said diaphragm as measured to the region where said diaphragm is mounted to said rim of the bell.

5. The improved land source apparatus for transmitting powerful seismic energy impulses into the earth as claimed in claim 3 in which:

the diameter of said hump as measured out to the mean diameter of its peripheral region is at least 60% of the diameter of said diaphragm as measured out to the region where said diaphragm is mounted to said rim of the bell.

* * * * *